June 16, 1925.
T. F. O'NEILL ET AL
1,542,472
WARM AIR SYRINGE
Filed Nov. 25, 1924
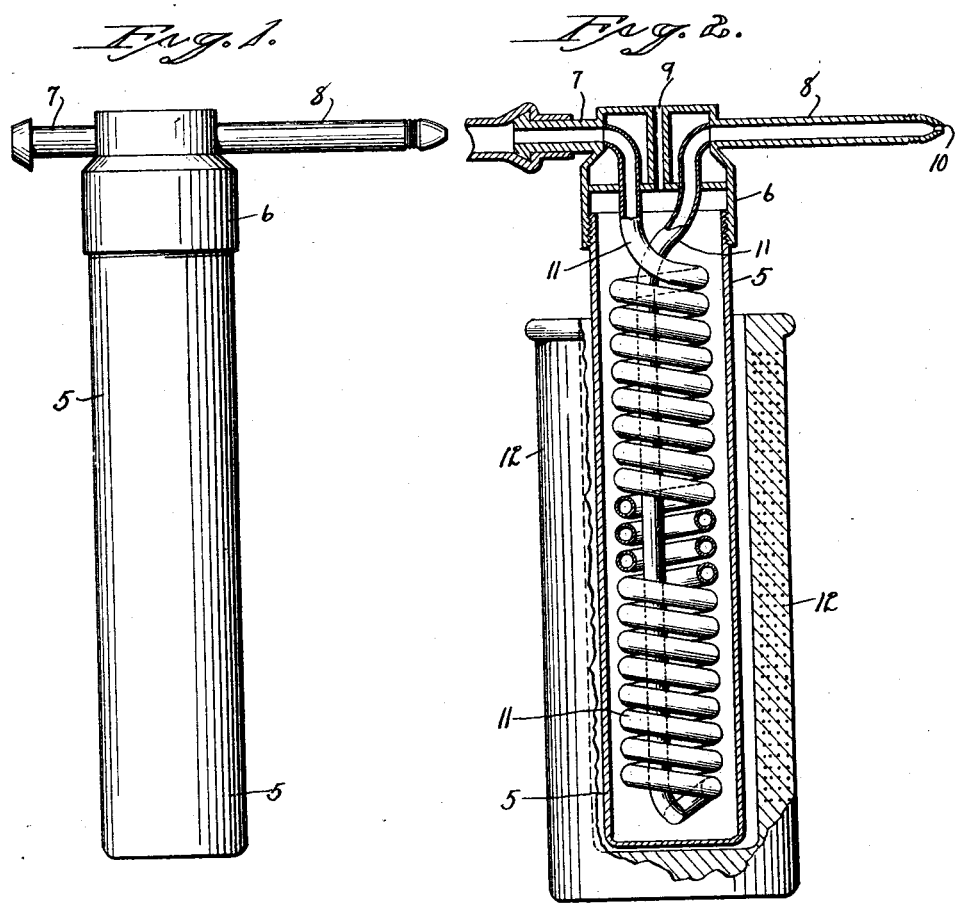

Patented June 16, 1925.

1,542,472

UNITED STATES PATENT OFFICE.

THOMAS F. O'NEILL, OF NEW HAVEN, CONNECTICUT, AND RAYMOND J. MILLER, OF NEW YORK, N. Y.

WARM-AIR SYRINGE.

Application filed November 25, 1924. Serial No. 752,103.

*To all whom it may concern:*

Be it known that we, THOMAS F. O'NEILL and RAYMOND J. MILLER, citizens of the United States, residing at New Haven, in the county of New Haven and State of Connecticut, and at New York, in the county of New York and State of New York, respectively, have invented a new and useful Improvement in Warm-Air Syringes; and we do hereby declare the following, when taken in connection with the accompanying drawings and the characters of reference marked thereon, to be a full, clear, and exact description of the same, and which said drawings constitute part of this application, and represent, in—

Fig. 1 a side view of a warm-air syringe constructed in accordance with our invention.

Fig. 2 a sectional view showing the same set into an electric heater.

This invention relates to improvement in warm-air syringes, such as are commonly used in dentistry and surgery. Most dentists' equipment includes an electric heater, into which tubular liquid containers may be placed and by which the liquid may be heated to the desired temperature. Air for drying cavities, etc., is commonly used, and the object of this invention is to provide a device by which air may be readily heated in an ordinary electric heater, without requiring further equipment than that commonly possessed by dentists and surgeons, and the invention consists in the construction as hereinafter described and particularly recited in the claims.

In carrying out our invention, we employ a tubular casing 5 of copper or any other suitable material, provided with a head 6, preferably having threaded engagement with the casing, so that it may be removed. This head mounts an inlet-nipple 7 and an outlet-nipple 8, and is preferably provided with a centrally-arranged vent 9, the inlet-nipple being connected with the usual source of air-supply either from a compressed-air tank or from a foot or otherwise operated bellows, while the outlet-nipple 8 is provided with a small perforation 10 through which air may escape. The inlet-nipple 7 is connected with one end of a coil 11 within the casing 5. From the lower end of the coil the pipe is extended upward through the coil and into connection with the outlet-nipple 8.

The casing may be filled, or partly filled, with liquid, if desired, as this will facilitate the distribution of heat. The casing corresponds in size to standard spray bottles and is adapted to be entered into a standard electric heater 12, so that air in the coil is heated to the desired temperature, and a sufficient amount of air will be uniformly heated to last for the desired period.

A feature of this invention is that it can be produced at a comparatively low cost and can be heated in various forms of heaters now commonly on the market and in the equipment of dentists and surgeons, thus avoiding the expense of a special electrical device for heating air.

Another advantage of this invention is that the device will maintain an even temperature of air while in use, as the heated air in the coil must escape before any cold air can enter, and the air is evenly heated, which is not possible when it is heated by passing over electrically-heated coils.

We claim:

1. A warm-air syringe, comprising a tubular casing adapted to be entered into an electric heater, said casing provided with a removable head, said head provided with inlet- and outlet-nipples, a coil within said casing, one end of the coil connected with the inlet-nipple, and the other end of the coil connected with the outlet-nipple.

2. A warm-air syringe, comprising a tubular casing adapted to be entered into an electric heater, said casing provided with a removable head, said head provided with inlet- and outlet-nipples, a coil within said casing, one end of the coil connected with the inlet-nipple and the other end of the coil connected with the outlet-nipple, and a vent through said head.

In testimony whereof, we have signed this specification in the presence of two subscribing witnesses.

THOS. F. O'NEILL.
RAYMOND J. MILLER.

Witnesses as to O'Neill:
FREDERIC C. EARLE,
MALCOLM P. NICHOLS.
Witnesses as to Miller:
J. W. BELLINGHAM,
E. H. KOEHLER.